Aug. 4, 1959  K. GEBELE  2,897,739
PHOTOGRAPHIC CAMERA WITH INTERCHANGEABLE LENS MOUNT
Filed Jan. 13, 1956
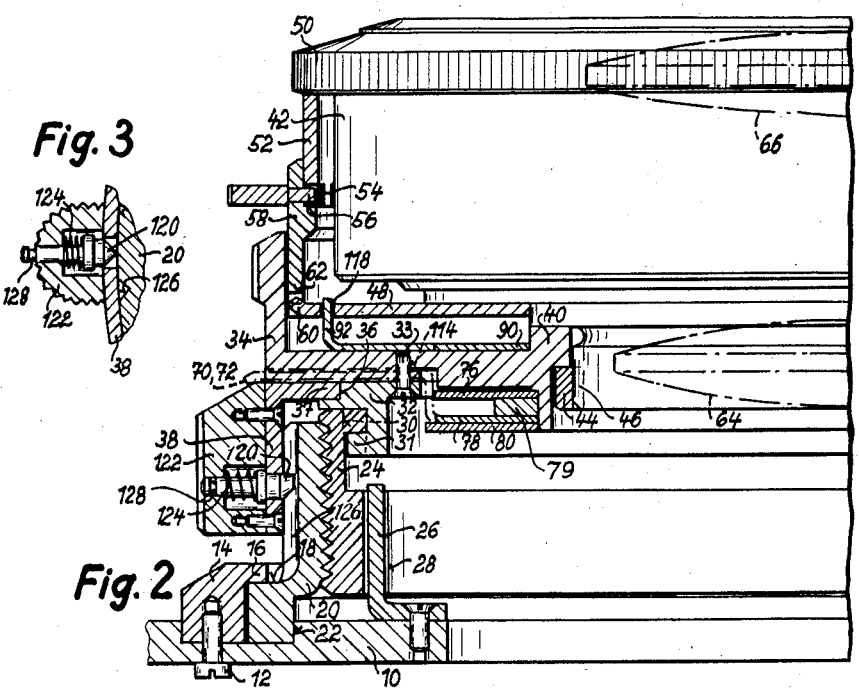
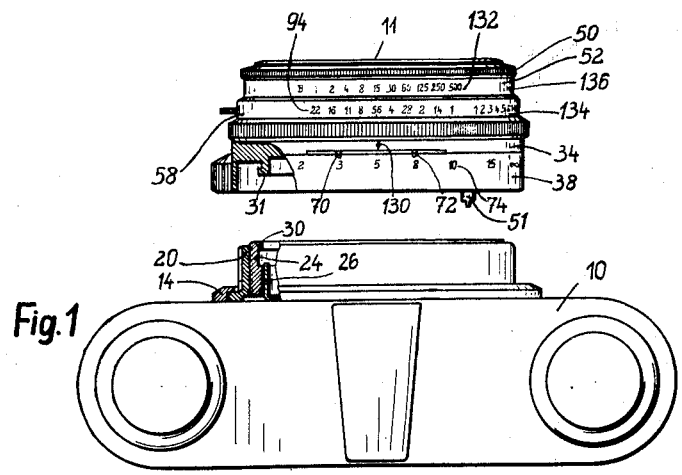

2,897,739
Patented Aug. 4, 1959

2,897,739
PHOTOGRAPHIC CAMERA WITH INTERCHANGEABLE LENS MOUNT

Kurt Gebele, Munich, Germany, assignor to Hans Deckel, Munich, Germany, and Friedrich Wilhelm Deckel, Zug, Switzerland Application January 13, 1956, Serial No. 559,058

Claims priority, application Germany January 5, 1955

9 Claims. (Cl. 95—45)

The present invention relates to a photographic camera equipped with an interchangeable lens mount of the focusing type, in which part or all of the lens mount is movable axially along the optical axis, for focusing purposes.

An object of the invention is the provision of a generally improved and more satisfactory construction of this kind.

Another object is the provision of a simplified construction minimizing the number of parts required for a given number of interchangeable lens units.

Still another object is the provision of a construction in which the parts which cause axial movement of the lens mount for focusing purposes are carried by the camera body rather than by the interchangeable mount itself, so that a single set of such parts is sufficient for actuating all of the interchangeable lens mounts when they are respectively attached to the camera body, eliminating the need for duplicating these parts within each lens mount.

A further object is the provision of an interchangeable lens mount structure so designed and constructed that certain parts requiring great accuracy and therefore considerable expense to build, e.g., the screw threaded parts for axially moving the lenses, are mounted on the camera in position to cooperate with any selected one of a series of interchangeable lens mounts, so that such parts need not be furnished on each individual lens mount.

These and other desirable objects may be attained in the manner disclosed as an illustrative embodiment of the invention in the following description and in the accompanying drawings forming a part hereof, in which:

Fig. 1 is a top plan view of a camera and lens mount structure according to one embodiment of the present invention, showing the lens mount slightly spaced from the camera in the position of being put on or removed from the camera;

Fig. 2 is a fragmentary radial section through a portion of the camera body and lens mount structure attached thereto; and Fig. 3 is a fragmentary section on a plane perpendicular to the optical axis, through part of the structure shown in Fig. 2.

The same reference numerals throughout the several views indicate the same parts.

In a focusing lens mount, the screw threaded parts which, upon relative rotation, serve to move the lenses accurately for focusing, are among the most troublesome and expensive parts to manufacture. Therefore, there would be considerable advantage in providing only a single set of such screw threaded parts, mounted permanently on the camera body and adapted to cooperate with all of the different lens mounts which may be interchangeably or selectively used on the camera, so as to eliminate the need for providing such screw threaded parts on each individual lens mount. The present invention provides a simple, satisfactory, efficient, and inexpensive manner of accomplishing this.

In the embodiment illustrated as a typical and preferred form of the invention, the camera body indicated diagrammatically and in general at 10 receives interchangeably any one of a series of lens mounts, one of which is indicated in general at 11. For this purpose, the camera body has a mounting ring 14 secured to its front wall by screws 12. At its forward end, this mounting ring 14 has a flange or lip 16 extending radially inwardly, in overlying relation to a shoulder 18 on a ring 20 which has its rear end mounted for rotation in a recess 22 in the front wall of the camera body. Thus the ring 20 is free to rotate, but is held against axial movement in either direction.

This ring 20 is mainly of an approximately cylindrical shape and is provided internally with accurate screw threads of high precision, which mate with corresponding external screw threads on the cylindrical ring or bushing 24 which is held against rotation by a fixed lug or post 26 secured in stationary position on the front wall of the camera body and lying in an axially extending slot or groove 28 in the ring 24. Thus, whenever the ring 20 is rotated relative to the camera body, the ring 24 cannot rotate therewith but will travel axially forwardly or rearwardly, as the case may be. By the various parts hereafter described, this forward or backward traveling motion of the ring 24 is transmitted to the appropriate part of an interchangeable lens mount which may be attached to the camera.

At the front end of the ring or bushing 24 there is a flange extending radially inwardly and provided with bayonet slots 30 cooperating with bayonet lugs 31 on a bayonet ring 32 which is secured by screws 33 to the mounting part or main body 34 of the interchangeable lens mount. Other appropriate parts of the lens mount are supported directly or indirectly from this body 34. A circumferential recess 36 on the mount, conveniently formed between the rear face of the body 34 and a portion of the ring 32, serves for rotatably mounting an internal flange or rim 37 of a circumferentially extending ring 38 which is rotatable on the interchangeable mount for purposes of focusing and which is coupled to the ring 20 on the camera, to cause rotation thereof, by suitable coupling means such as the pin 120 which extends radially with respect to the optical axis and which is mounted in the finger piece 122 secured to one side of the focus adjusting ring 38, for limited movement in a direction axially of the pin and radially with respect to the optical axis. A spring 124 tends to move the pin radially inwardly towards the optical axis so as to engage the pointed inner end thereof with an axially extending notch 126 formed on the outer face of the ring 20.

As the focus adjusting ring 38 is turned (after the interchangeable unit is mounted on the camera) the inner end of the pin 120 will snap into the notch 126 as soon as it comes opposite the notch, and thereafter the ring 38 will be coupled to the ring 20 through the medium of the pin, so that any turning of the ring 38 will cause corresponding turning of the ring 20, thereby moving the ring 24 and the entire interchangeable lens assembly axially forwardly or backwardly for focusing purposes.

The outer end of the pin 120 preferably has a peripheral recess 128 which is painted a bright and conspicuous color, and which projects out beyond the finger piece 122 as seen in Fig. 3, whenever the pin is not seated in the notch 126 but rides on a smooth part of the periphery of the ring 20. This warns the operator that the parts are not yet in proper coupled position. When the pin slips into the notch, the outer end of the pin is approximately flush with the finger piece 122 and the color in the groove 128 does not show.

The focusing scale (graduated, e. g., in meters or feet) is preferably provided on the periphery of the rotating focusing ring 38, as indicated at 74 in Fig. 1, and is read in conjunction with a fixed index mark or reference point 130 mounted on a non-rotating part of the unit, such as the body member 34. With different types of lenses having different focal lengths, a given amount of rotation of the ring 20 and given amount of axial displacement of the ring 24 may produce very different focusing effects in one lens mount than in another lens mount. This is adequately provided for, however, because each individual lens mount has its individual focusing scale 74 adapted to the particular requirements of that particular lens mount, even though all of the lens mounts are moved in the axial direction by the same identical parts 20, 24.

It is seen that the structure thus far described provides for an axial or focusing movement of the entire lens mount, irrespective of its focal length or other optical characteristics, by means of a single set of interengaged threaded parts mounted permanently on the camera body and separable from the lens mount itself, and each lens mount is provided with its individual focusing scale so as to correlate the axial movements of the mount with the proper focusing information. The other features of the lens mount may be of any desired form and may be varied in detail to a considerable extent.

For instance, the body member 34 may have a flange portion which extends a considerable distance radially inwardly from the externally visible part of this member and which terminates in a shouldered portion or rim 40 on which is mounted the camera shutter 42. Preferably this mounting of the shutter is accomplished by having the usual rear mounting flange or rear lens tube 46 of the shutter structure embraced within the shouldered portion 40 of the body member 34 and held therein by a nut 44 screwed onto the usual external screw threads of the mounting flange 46. The shutter is provided with the usual iris diaphragm leaves or blades (not shown) adjustable to vary the size of the aperture or stop by turning a diaphragm adjusting ring 48 rotatably mounted near the rear of the shutter casing. At its front, the shutter carries the usual adjusting ring 50, rotatable to vary or control the shutter speed or length of exposure. Photographic shutters having such diaphragm aperture adjusting rings and shutter speed adjusting rings are well known, and any suitable form of such shutter may be employed, the interior details of which are not pertinent to the present invention. Typical examples of suitable forms of shutter which may be used for this purpose are disclosed in the copending United States patent applications of Kurt Gebele, Serial No. 514,218, filed June 9, 1955, and Serial No. 520,875, filed July 8, 1955. The shutter is operated and controlled by any suitable known means, such as the shaft 51 (Fig. 1) extending out the rear of the detachable unit, in a direction parallel to the optical axis, and extending into the body of the camera on which the detachable unit is mounted, suitable mechanism (such as shown, e.g., in said copending application Serial No. 514,218) being provided within the camera body for turning the shaft 51 in one direction to cock or tension the shutter ready for making an exposure, and in the opposite direction for releasing or triggering the shutter to make the exposure.

The shutter speed setting ring 50 has secured to it a rearwardly extending cylindrical skirt or flange 52 surrounding the shutter casing 42. The rear edge of this flange 52 is provided, through part of its periphery, with a series of notches 54, in any selected one of which there may be seated a tooth 56 on a cylindrical coupling ring 58. The front end of this coupling ring 58 surrounds and is axially slidable on the rear portion of the flange 52, while the rear end of the coupling ring 58 extends within and is axially slidable in the fixed body member 34. A tooth 60 on the diaphragm adjusting ring 48 enters a notch 62 in the rear end of the coupling ring 58. The diaphragm adjusting ring is somewhat resilient or elastic, and normally tends to hold the coupling ring 58 in its forward position seen in Fig. 2, with the tooth 56 engaged in one of the notches 54. However, the coupling ring 58 is provided with one or more finger pieces 63 which may be easily engaged by the operator's fingers to move the coupling ring 58 slightly rearwardly, against the resilience or elasticity of the diaphragm adjusting ring 48, so as to disengage the tooth 56 from the notch 54 in which it was seated, whereupon the coupling ring 58 may be turned relative to the shutter speed adjusting parts 50, 52 to produce a different relationship of orientation. Then the release of the rearward pressure on the coupling ring 58 will enable the elasticity of the diaphragm setting ring 48 to move the coupling ring 58 axially forwardly again to seat the tooth 56 in the appropriate one of the notches 54.

Suitable lenses are mounted in the unit, preferably including a rear lens component 64 mounted in the rear mounting flange and lens tube 46 of the shutter structure, and a front lens component 66 mounted in the usual front lens tube customarily found in an objective shutter. Thus, although the unit is of the adjustable or variable focus type rather than the fixed focus type, no special lens mounting tubes or other special mounts are needed, since the lenses are mounted in the usual standard lens mounting tubes of the shutter structure and the entire shutter structure itself, with the lenses, move backwardly and forwardly for focusing when the focus adjusting ring 38 is turned. It may be mentioned at this point that the shutter speed adjusting ring 50 is provided with a circumferentially extending rib or ridge which is serrated for easy grasping and turning by the fingers of the operator, as shown. Also the main body member 34 of the unit has a circumferentially extending raised rib or ridge likewise serrated, as shown, for easy grasping in order to turn the entire unit when mounting it on or taking it off of the camera by engaging or disengaging the bayonet connection parts 30, 31.

The preferred structure of the present invention includes depth of field indicating mechanism incorporated in the detachable unit along with the shutter, the lenses, the diaphragm aperture adjusting parts, and the focus adjusting parts. The depth of field indicator comprises two pointers or indicating arms 70 and 72 which extend outwardly through a circumferential slot 114 in the body member 34 and which have ends which sweep over and are read in conjunction with the distance graduations on the focusing scale 74 which is marked on the focus adjusting ring 38 as previously mentioned. These pointers 70 and 72 are formed as arms on rings 76 and 78, respectively, which rotate on a flange of the body member 34 and are slightly separated from each other by a spacing sleeve 79 between them, and are held in place by a ring 80 fixed to the part 34.

The details of the mechanism for operating these rings 76, 78 and the pointer arms 70, 72 are not important for purposes of the present invention and may be constructed in any suitable way, such as the construction disclosed in the copending U.S. patent application of Kurt Gebele, Serial No. 557,183, filed January 3, 1956, of which the present application is a continuation-in-part. It is sufficient for present purposes to say that the rings 76 and 78 are geared to each other to move conjointly in opposite directions, symmetrically with respect to the fixed reference mark 130, and are operated through suitable mechanism from a ring 90 which turns about the optical axis as a center in accordance with the turning movements of the diaphragm aperture adjusting ring 48. For instance the ring 90 may have a radial arm the outer end of which is bent forwardly at 92 and which passes into a notch 118 in the diaphragm aperture setting ring 48, to couple the two rings 48 and 90 to each other for conjoint rotary movement.

As explained in said copending application last referred to, turning the ring 48 to stop down the iris diaphragm to a smaller aperture will move the rings 76 and 78 to spread the pointer arms 70 and 72 farther apart from each other, to indicate the increased depth of field by showing, on the focusing distance scale 74, the maximum and minimum distances at which objects along the optical axis will be in satisfactorily sharp focus. When the diaphragm setting ring 48 is turned in the opposite direction to increase the size of the stop or aperture, the rings 76 and 78 are turned to bring the pointer arms 70 and 72 closer to each other, to indicate the smaller depth of field.

This arrangement could be used, of course, when there is no coupling between the diaphragm aperture setting member 48 and the shutter speed setting member 50. However, in the preferred construction, these parts are coupled to each other by means of the coupling ring 58, coupling tooth 56, and notches 54, as already mentioned, and are set in desired positions of relative orientation by means of a total or integrated exposure value scale 134 on the coupling ring 58 read in conjunction with an index mark 136 on the skirt or flange 52 of the speed setting ring. Such setting to integrated exposure values is in accordance with the illumination or light value of the subject to be photographed, plus allowance for filter factor and for film speed. Thus in normal use, after the mechanism has once been set for a particular integrated exposure value and so long as the conditions determining the exposure value do not change, the further setting of the mechanism (except with respect to focusing) is accomplished by turning the speed setting ring 50 at the front of the structure, which varies the speed of the shutter and at the same time makes complementary adjustments of the diaphragm aperture and also moves the depth of field indicating members 70 and 72, so that the operator may obtain the particular depth of field he wants, by turning the ring 50.

While this is the preferred construction, and is the structure of greatest usefulness, it is apparent that many of the advantages of the present invention may be realized even if the diaphragm aperture setting member is not coupled to the shutter speed setting member, leaving these two members to be independently adjusted.

To allow independent adjustment (and also to provide for adjusting shutter speed per se, as needed when there are moving objects to be photographed) there are preferably a diaphragm aperture scale or stop scale 94 marked on the ring 58, and a shutter speed scale 132 on the flange 52 of the shutter speed adjusting ring 50, both scales being read in conjunction with the same fixed reference mark 130 which serves for reading the focus distance scale 74. However, those skilled in this art will realize that whenever the coupling parts 54, 56, 58 are employed as in the preferred form of the invention, and when the integrated exposure value scale 134 is likewise present, then the diaphragm aperture scale 94 may be entirely omitted without departing from the invention, because all of the information conveyed to the operator by this diaphragm aperture scale 94 will also be conveyed to him, in an even better and more usable manner, by observing the position of the depth of field indicators 70 and 72 on the focusing distance scale 74, in conjunction with the information afforded by the integrated exposure value scale 134 and the shutter speed scale 132. Consideration of the latter scale is needed, however, only if the scene to be photographed contains moving objects, and if all of the objects are stationary, then even the shutter speed scale can be left out of consideration, the operator confining his attention to the integrated exposure value scale 134 and the depth of field indicators 70 and 72, in conjunction, of course, with the focusing scale 74.

One of the advantages of the present construction, in its preferred form, is that since each of the interchangeable lens units carries its own focusing scale, the reference point 130 of this scale may be placed in such position on the structure that it will always be uppermost or at the top of the structure, in the most easily read position, when the interchangeable unit is applied in normal working position on the camera body. The bayonet connections 30, 31 can easily be constructed in such a way that the interchangeable unit can be applied to the camera body only in a single given position of orientation, which will insure that the reference mark 130 will be uppermost. This can be done more easily and at less cost than is possible when an interchangeable lens unit is connected by a screw thread to the camera body, for this usually requires what is called a "qualified" thread or some other special means for insuring that when the interchangeable unit is screwed onto a snug or tight position, the reference mark of the scale will be at the top. Another advantage of the preferred construction is that the reference mark 130 of the focusing scale is placed on the member 34 which is stationary in a rotational sense (although moving axially when focusing) from which it follows that the mechanism within the interchangeable unit which swings the field indicating arms 70 and 72 can also be mounted in a fixed position within the unit, since such mechanism is intended to swing these arms 70 and 72 symmetrically with respect to the reference point 130. However, with some loss of some of these advantages, yet still within the scope of the broader aspects of the invention, it is possible to reverse the focusing scale 74 and the referencee mark 130, placing the focusing scale on the rotationally fixed part 34 and placing the reference mark on the rotary part 38. This is not usually desired, as it makes the depth of field indicating mechanism more complicated, and it requires the operator to look for the reference mark 130 not always at the top or uppermost part of the unit, but displaced to one side or the other depending on the rotary position of the focus adjusting ring 38.

Another possible variation is in the manner of turning the ring 20 through the rotary movements which cause the axial focusing movement. In the preferred construction, the ring 20 is turned in its focusing movement by means of parts mounted on the interchangeable unit, i.e., the ring 38, finger piece 122, coupling pin 120, etc. However, the manually operable member for turning the ring 20 in its focusing movements could be mounted permanently on the camera body, if desired, instead of being placed on the interchangeable unit, and could be coupled in any suitable manner to a movable focusing scale number on the interchangeable unit.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. The combination with a photographic camera body having a front wall and an optical axis extending substantially perpendicular to said front wall, of a first ring member mounted on said front wall for rotation about said optical axis as a center and restrained against axial movement with respect to said front wall, a second ring member telescopically arranged with respect to said first ring member and in screw threaded engagement therewith, interengaging parts on said second ring member and said camera body for holding said second ring member against rotation while permitting axial movement thereof, so that when said first ring member is rotated with respect to said camera body the screw threaded engagement thereof with said second ring member will cause axial movement of said second ring member, a detachable lens mount, cooperating bayonet engagement parts on said lens mount and said second ring member for attaching said lens mount to said second ring member to be supported thereby, a focus adjusting member rotatable on said lens mount, and detachable connecting means for operatively connecting said focus adjusting member to said first ring member so that rotation of said focus adjusting member on said lens mount will cause corresponding rotation of said first ring member, thereby producing axial movement of said second ring member and said lens mount for focusing.

2. A construction as defined in claim 1, in which said lens mount and focus adjusting member carry a focus distance scale and a reference mark in connection with which said scale is read.

3. A construction as defined in claim 2, in which said focus distance scale is on said focus adjusting member and said reference mark is on a non-rotary part of said lens mount.

4. A construction as defined in claim 2, in which said lens mount includes a pair of pointer members rotatably mounted to move toward and away from each other along said focus distance scale, to indicate by reference to such scale the nearest and farthest distances along the optical axis within which objects will be in acceptably sharp focus.

5. A construction as defined in claim 1, in which said detachable connecting means includes an axially extending slot in said first ring member, a pin mounted on said focus adjusting member for radial movement with respect to said optical axis and capable of being brought into alinement with said slot when said first ring member and said focus adjusting member are in a predetermined position of orientation with respect to each other, and a spring tending to move said pin radially into said slot when it is alined therewith.

6. A photographic camera construction comprising a camera body, a detachable lens unit, means mounted on said body and remaining on said body when said lens unit is detached therefrom, for moving said lens unit axially for focusing, a focus adjusting member movably mounted on said lens unit and remaining therewith when said unit is detached from said body, and means operatively coupling said focus adjusting member on said unit to said focusing means on said body to move the latter from movement of the former, when said unit is in normal attached position on said body.

7. A photographic camera construction comprising a camera body, a detachable lens unit, means mounted on said body and remaining on said body when said lens unit is detached therefrom, for moving said lens unit axially for focusing, a focus adjusting member movably mounted on said lens unit and remaining therewith when said unit is detached from said body, means operatively coupling said focus adjusting member on said unit to said focusing means on said body to move the latter from movement of the former, when said unit is in normal attached position on said body, and focusing scale means mounted on said lens unit and remaining therewith when said unit is detached from said body, for indicating the distance for which said lens unit is focused at any given position of said focus adjusting member on said unit and corresponding position of said focusing means on said body.

8. A construction as defined in claim 6, in which said coupling means has an effective coupling position and an ineffective position, further including a warning signal associated with said coupling means for warning the operator when it is in its ineffective position.

9. A construction as defined in claim 6, in which said focusing means mounted on said body for moving said lens unit axially includes a sleeve mounted for rotation on said body and held against axial movement thereon, said sleeve having an axially extending groove at one point of its periphery and having substantially smooth peripheral surfaces extending circumferentially a substantial distance in both directions from said groove, and in which said coupling means includes a spring pressed plunger secured to said focus adjusting member on said lens unit and adapted to press approximately radially against said circumferentially extending peripheral surface when said unit is first mounted on said camera body, said plunger entering said groove when said focus adjusting member on said unit is turned to bring said plunger into registry with said groove.

References Cited in the file of this patent

UNITED STATES PATENTS

| 2,027,411 | Whittaker | Jan. 14, 1936 |
| 2,172,338 | Mihalyi | Sept. 5, 1939 |
| 2,263,024 | Wood | Nov. 18, 1941 |
| 2,527,106 | Smith | Oct. 24, 1950 |
| 2,596,328 | Dorsey | May 13, 1952 |

FOREIGN PATENTS

| 410,458 | Great Britain | Aug. 29, 1932 |
| 1,111,448 | France | Oct. 26, 1955 |